(12) United States Patent
Miller

(10) Patent No.: US 9,035,492 B1
(45) Date of Patent: May 19, 2015

(54) SYSTEM AND METHOD FOR MANAGEMENT OF A DC AND AC BUS MICROGRID

(75) Inventor: Landon Cabell Garland Miller, Tuscaloosa, AL (US)

(73) Assignee: Science Applications International Corporation, McLean, VA (US)

( * ) Notice: Subject to any disclaimer, the term of this patent is extended or adjusted under 35 U.S.C. 154(b) by 646 days.

(21) Appl. No.: 13/427,876

(22) Filed: Mar. 22, 2012

Related U.S. Application Data

(62) Division of application No. 12/760,654, filed on Apr. 15, 2010, now Pat. No. 8,164,217.

(51) Int. Cl.
*H02J 7/00* (2006.01)
*H02J 9/00* (2006.01)
*G06F 5/00* (2006.01)

(52) U.S. Cl.
CPC .... *H02J 7/00* (2013.01); *H02J 9/00* (2013.01); *G06F 5/00* (2013.01)

(58) Field of Classification Search
CPC ............... H02J 7/00; H02J 9/00; H02J 9/04
USPC ............................. 307/26, 64, 65, 66; 700/286
See application file for complete search history.

(56) References Cited

U.S. PATENT DOCUMENTS

| | | | |
|---|---|---|---|
| 5,804,953 A | 9/1998 | Bowyer et al. | 323/256 |
| 6,295,215 B1 | 9/2001 | Faria et al. | |
| 6,603,672 B1 | 8/2003 | Deng et al. | 363/37 |
| 6,693,409 B2 | 2/2004 | Lynch et al. | 323/208 |
| 6,724,644 B2 | 4/2004 | Loef | 363/89 |
| 6,765,370 B2 | 7/2004 | Bradley | 323/222 |
| 6,778,414 B2 | 8/2004 | Chang et al. | 363/67 |
| 6,819,087 B2 | 11/2004 | Delmerico et al. | 322/58 |
| 6,847,130 B1 | 1/2005 | Belehradek et al. | |
| 7,057,376 B2 | 6/2006 | Cook et al. | 323/207 |
| 7,062,359 B2 | 6/2006 | Bjorklund | |
| 7,116,010 B2 | 10/2006 | Lasseter et al. | 307/45 |

(Continued)

OTHER PUBLICATIONS

M. Mahmoodi, R. Noroozian, G. B. Gharehpetian, M. Abedi, "A Suitable Power Transfer Control System for Interconnection Converter of DC Microgrids," International Conference on Renewable Energies and Power Quality (ICREPQ), Mar. 12-14, 2008, Santander, Spain.

(Continued)

*Primary Examiner* — Hal Kaplan
(74) *Attorney, Agent, or Firm* — Dawn-Marie Bey; Bey & Cotropia PLLC

(57) ABSTRACT

Systems and methods are described herein for managing the operations of a microgrid module. The microgrid module includes transformers and/or power converters necessary for modifying the input AC or DC power sources to meet the required characteristics of the output power. The microgrid module further comprises a power management software module and a control software module installed on a microgrid computer. The power management software module uses received business parameters to create rules for applying to the operation of the microgrid module. The rules are stored locally at the microgrid computer so that they can be quickly accessed by a control software module. The control software module uses the rules in combination with data collected from sensors installed in the physical circuitry layer of the microgrid module to control the operations of the microgrid module.

12 Claims, 11 Drawing Sheets

(56) References Cited

U.S. PATENT DOCUMENTS

| | | | |
|---|---|---|---|
| 7,117,044 B2 | 10/2006 | Kocher et al. | 700/34 |
| 7,274,974 B2 | 9/2007 | Brown et al. | |
| 7,652,393 B2 | 1/2010 | Moth | 307/64 |
| 7,786,616 B2 | 8/2010 | Naden et al. | 307/64 |
| 7,834,479 B2 | 11/2010 | Capp et al. | |
| 7,978,445 B2 | 7/2011 | Ritter | 361/18 |
| 8,067,855 B2 | 11/2011 | Mumtaz et al. | 307/45 |
| 8,140,194 B2 | 3/2012 | Iino et al. | |
| 8,164,217 B1 | 4/2012 | Miller | |
| 8,183,714 B2 | 5/2012 | McDonnell | |
| 8,193,661 B2 | 6/2012 | Jagota et al. | |
| 8,289,742 B2 | 10/2012 | Adest et al. | |
| 8,315,745 B2 | 11/2012 | Creed | |
| 8,345,454 B1 | 1/2013 | Krolak et al. | |
| 8,401,709 B2 | 3/2013 | Cherian et al. | |
| 8,421,270 B1 | 4/2013 | Miller et al. | |
| 8,442,698 B2 | 5/2013 | Fahimi et al. | |
| 8,447,435 B1 | 5/2013 | Miller et al. | |
| 2002/0036430 A1 | 3/2002 | Welches et al. | 307/18 |
| 2002/0135492 A1 | 9/2002 | Reagan et al. | 340/3.9 |
| 2004/0061380 A1 | 4/2004 | Hann et al. | 307/43 |
| 2004/0124711 A1 | 7/2004 | Muchow et al. | 307/64 |
| 2004/0125618 A1 | 7/2004 | De Rooij et al. | |
| 2005/0105306 A1 | 5/2005 | Deng et al. | 363/37 |
| 2006/0092588 A1 | 5/2006 | Realmuto et al. | |
| 2007/0273211 A1 | 11/2007 | Wang et al. | |
| 2008/0103630 A1 | 5/2008 | Eckroad | |
| 2008/0143304 A1 | 6/2008 | Bose et al. | 323/205 |
| 2008/0269953 A1 | 10/2008 | Steels et al. | |
| 2008/0290143 A1 | 11/2008 | Neklyudov et al. | |
| 2008/0298103 A1 | 12/2008 | Bendre et al. | |
| 2008/0301757 A1 | 12/2008 | Demarest et al. | |
| 2009/0001815 A1 | 1/2009 | Kohler et al. | |
| 2009/0289507 A1 | 11/2009 | Shiu | |
| 2010/0001587 A1 | 1/2010 | Casey et al. | |
| 2010/0008117 A1 | 1/2010 | Luthi et al. | |
| 2010/0292853 A1 | 11/2010 | McDonnell | |
| 2011/0026282 A1 | 2/2011 | Chapman et al. | 363/65 |
| 2011/0080143 A1 | 4/2011 | Parakulam et al. | |
| 2011/0093127 A1 | 4/2011 | Kaplan | |
| 2011/0231028 A1 | 9/2011 | Ozog | |
| 2011/0278931 A1 | 11/2011 | Johnson, Jr. | |
| 2012/0173035 A1 | 7/2012 | Abe | |
| 2012/0232709 A1 | 9/2012 | Robinett, III et al. | |

OTHER PUBLICATIONS

M. Mahmoodi, G. B. Gharehpetian, "Simple Electrical Circuit for Large Signal Modeling of DC Microgrids," International Conference on Renewable Energies and Power Quality (ICREPQ), Apr. 15-17, 2009, Valencia, Spain.

J. Wang, J. Zhang, Y. Zhong, "Study on a Super Capacitor Energy Storage System for Improving the Operating Stability of Distributed Generation System," DRPT2008, Apr. 6-9, 2008, Nanjing, China. ICREPQ08 Programme, Santander, Mar. 12, 13, 14, 2008.

Specification and Claims for U.S. Appl. No. 12/828,637, filed Jul. 1, 2010.

Abdallah, et al., "Control Dynamics of Adaptive and Scalable Power and Energy Systems for Military Micro Grids," Constructions Engineering Research Laboratory, U.S. Army Corps of Engineers, Dec. 2006.

Balog, R. S., Krein, P. T., "Bus Selection in Multibus DC Power Systems," Electric Ship Technologies Symposium, 2007, ESTS '07, IEEE, pp. 281, 287, May 21-23, 2007.

Barnes, et al., "Real-World Microgrids—An Overview," IEEE International Conference on System of Systems Engineering, pp. 1-8, Apr. 2007.

Seul-Ki, et al., "Dynamic Modeling and Control of a Grid-Connected Hybrid Generation System With Versatile Power Transfer," IEEE Trans Ind Electron, vol. 55, No. 4, pp. 1677-1688, Apr. 2008.

Specification and Claims for U.S. Appl. No. 12/760,631, filed Apr. 15, 2010.

"Characterization of Microgrids in the United States," Final Whitepaper by Resource Dynamics Corporation (Jan. 2005).

SYSTEM AND METHOD FOR MANAGEMENT OF A DC AND AC BUS MICROGRID

CROSS-REFERENCE TO RELATED APPLICATIONS

This application is a divisional of U.S. application Ser. No. 12/760,654, filed Apr. 15, 2010, entitled "System and Method For Management of a DC and AC Bus Microgrid," which is incorporated herein by reference in its entirety. The present application incorporates by reference in their entirety the following co-owned United States Patent Applications: U.S. application Ser. No. 12/760,631, filed Apr. 15, 2010, entitled "System and Method for Routing Power Across Multiple Microgrids Having DC and AC Buses," and U.S. application Ser. No. 12/760,647, filed Apr. 15, 2010, entitled "System and Method for a Controlled Interconnected DC and AC Bus Microgrid,".

BACKGROUND OF THE INVENTION

1. Field of Invention

The present invention relates generally to microgrids for controlling small distributed energy resources (DERs). More specifically, the present invention relates to a system and method for using business parameters to manage the operations of a microgrid with DC and AC inputs and outputs.

2. Description of Related Art

In general, microgrids are electric networks that are capable of deriving power from a number of sources including the conventional power grid, localized power generating capabilities and alternative power sources such as solar arrays and wind turbines. The microgrid can aggregate power from a number of sources, converting the different formats of power derived from multiple and diverse sources to common voltage and frequency formats that can be subsequently distributed to one or a number of loads. In addition, the microgrid can maintain the reliability of power to one or a number of loads in the face of changing power levels that are derived from the multiple and diverse sources. A microgrid can be coordinated to provide power from a variety of power sources and to provide power with greater reliability. For example, a microgrid can provide an alternate source of power to a site when there is an interruption in the power delivered by the conventional utility power grid. A microgrid also can provide an alternate source of power, such as power from a renewable energy source, when renewable energy is preferred over power delivered by the conventional utility power grid. The power that the microgrid supplies to a site may be derived from a variety of sources including energy storage devices, alternative energy sources such wind or solar power, or from burning conventional fossil fuels. A description of prior art microgrid configurations is found in the whitepaper entitled "Characterization of Microgrids in the United States" prepared for Sandia National Laboratories by Resource Dynamics Corporation dated January 2005 and incorporated herein by reference in its entirety.

In general, there are prior patents and published patent applications directed to various aspects of microgrids. For example, U.S. Pat. No. 6,819,087 discloses a distributed resource stabilization control for microgrid applications. U.S. Pat. No. 6,778,414 relates to a distributed system and methodology for electrical power regulation, conditioning and distribution on an aircraft. U.S. Pat. No. 6,765,370 discloses a system and method for bi-directional power conversion in a portable device. U.S. Published Patent Application No. 2008/0143304 describes a system and method for controlling a microgrid.

The disclosures in these prior patents and published patent applications is hereby incorporated herein by reference in their entirety. However, as described further below, none of these prior patents or published patent applications provides the solutions of the invention described and claimed in this application.

SUMMARY OF THE INVENTION

Summary of the Problem

The present state of the art for microgrid technology has several deficiencies, including the absence of a comprehensive system and method for managing the operation of a microgrid module capable of handling AC to AC, DC to DC, AC to DC, and DC to AC across multiple inputs and outputs. There is a further need to be able to use business rules derived, for example, from power pricing contracts and load sharing agreements, to manage the operation of the microgrid module. Also absent from the prior art is a scalable system capable of managing multiple microgrid modules. Finally, there is a need for a microgrid module power management system that can receive feedback from the operation of the microgrid module and adjust operating rules based on that feedback.

Thus there is a need for advances in the art of electrical microgrids and their management that addresses these deficiencies. Such deficiencies are overcome by the present invention, as is further detailed below.

Summary of the Solution

The present invention addresses the foregoing limitations in the existing art by providing a system and method for managing a microgrid that can operate with AC to AC, DC to DC, AC to DC, and DC to AC across multiple inputs and outputs. The present invention comprises a power management software module installed in a computing device coupled to a microgrid module. The power management software module can operate as a distributed control point capable of managing one or more microgrid modules. The power management software module can use parameters from contracts and business operations to establish rules for the operation of a microgrid module. In conjunction with a control software module, the power management software module can communicate with software operating sensors and controllable elements in the physical circuitry layer to manage the flow of power to and from the microgrid module.

In a first exemplary embodiment, the invention comprises an apparatus for managing a microgrid module comprising a microgrid computer coupled to the circuit layer of the microgrid module. The microgrid computer can comprise a power management software module that processes a business parameter such as a price associated with a power contract and creates a rule from the business parameter. The rule is stored in a computer-readable storage device for access by a control software module installed on the microgrid computer. The control software module is in communication with software at the physical circuit layer of the microgrid module. The software at the physical circuit layer operates sensors and controllable elements installed among the components of the physical circuit layer. The control software module can receive data from a sensor in the physical circuit layer, for example, data indicating an interruption in AC power supplied to the microgrid module. The control software module can apply the rule created by the power management module to the data received from the sensor in order to select a command to alter the operation of the microgrid module. The control software module can send the command to a controllable element, for example, a controllable element that initiates power delivery from an alternate power source to the microgrid module.

In another exemplary embodiment, the invention comprises a method for managing a microgrid module. The exemplary method begins with a microgrid computer storing a business parameter for access by a power management software module. The power management software module can convert the business parameter to a rule which is stored in memory with the microgrid computer. A control software module can access the rule and, in combination with data received from a sensor in the circuit layer of the microgrid module, the control software layer can select a command for altering the operation of the microgrid module. The control software layer can transmit the command to a controllable element in the circuit layer. For example, the command may initiate the delivery of power to the microgrid module from an alternate power source.

In yet another exemplary embodiment, the invention comprises a computer-readable medium comprising computer-executable instructions for execution on a microgrid computer. The computer-executable instructions include instructions for a power management software module to access a stored business parameter and to convert the business paramenter to a rule for use by a control software module. The computer-executable instructions also include instructions for the control software module to receive data from a sensor in the circuit layer of the microgrid module and to use the received data in combination with the stored rule to select a command for altering the operation of the microgrid module. The computer-executable instructions further include instructions for the control software module to transmit the command to a controllable element in the circuit layer to initiate the delivery of power to the microgrid module from an alternate power source.

These and other exemplary embodiments of the invention will be described in greater detail in the following text and in the associated figures.

DETAILED DESCRIPTION

Figure 1:
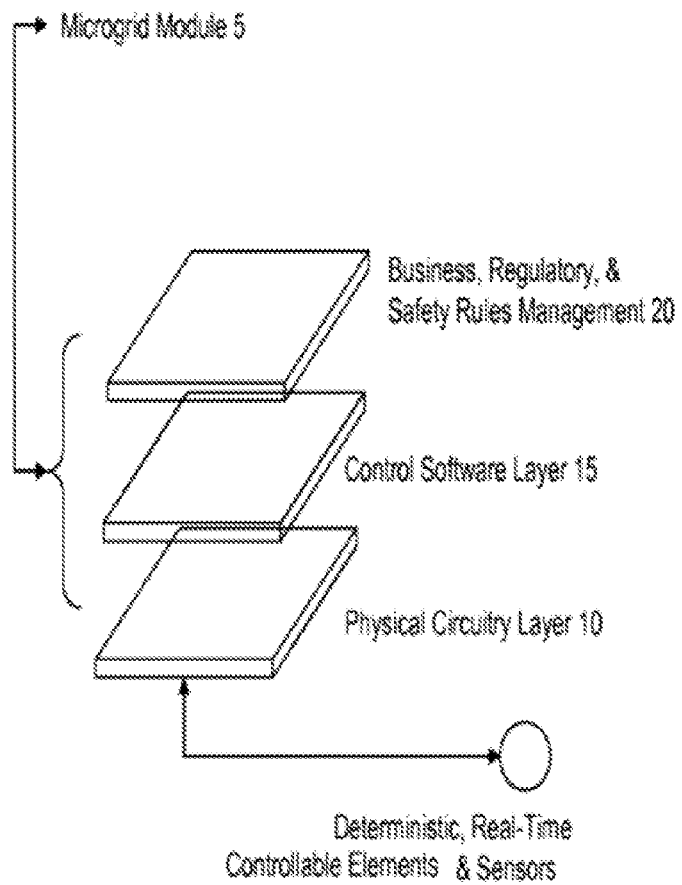
FIG. 1 is a diagram illustrating an overview of components in accordance with an exemplary embodiment of the invention.

The present invention comprises a portable microgrid module that is fully integrated and can manage both AC and DC inputs and AC and DC outputs. The microgrid module includes a computer comprising software for managing the operations of the microgrid module and a circuit layer comprising AC and DC buses, sensors, controllable elements, and converters. The computer further comprises a control software module, a power management module, and memory for storing rules associated with the operation of the microgrid module. The microgrid module also can include or be coupled to energy storage devices such as batteries and capacitors. As described in further detail in related patent applications filed herewith, the microgrid module also has the capability of being coupled to one or more other microgrid modules. The integrated control of the connection of multiple DC and AC buses within the microgrid module allows for deterministic real-time control over bi-directional power sources from intermittent and continuous renewable and conventional power sources. Real-time control over the distributed power sources supplying the microgrid module allows the microgrid module to respond to interruptions in one power supply and to transition to another power supply.

The microgrid module of the present invention can accept alternative, renewable, and conventional power inputs into both DC and AC buses and distributes or converts them as appropriate to match standardized bus values across the input, load, macrogrid, and microgrid to microgrid buses. The microgrid module can provide power conversion from DC to DC, AC to AC, AC to DC and DC to AC between the buses under dynamic local control. The microgrid of the present invention also has the capacity to store electrical energy or energy in a form transmutable into electrical energy, such as in a chemical form, for later distribution.

Each microgrid module can comprise various sub-systems and devices that include, but are not limited to, quick-connect/quick-disconnect bus bars and plates, step-up and step-down transformers, patch or inter-connection panels and intelligent breakers and sensors, batteries, ultra-capacitors, flywheels, and other temporary or permanent energy storage devices and systems and their control electronics. The microgrid module can also include power converters, circuitry to accommodate phase imbalance by providing the appropriate neutral connections, and various physical wiring and physical mounting capabilities to provide for adequate stabilization and insulation of the various components in the modular microgrid system.

As referenced above, installed on the microgrid module's computer are a power management software module and a control software module. The power management software module can retrieve one or more business parameters stored in a computer-readable memory and convert the one or more business parameters to rules for operating the microgrid module. The power management software module can store the rules in a local computer-readable memory typically located in the microgrid module's computer. The control software module receives data from sensors located in the physical circuitry layer of the microgrid module. The control software module can apply the rules stored in the local computer-readable memory to the data received from the sensors to determine which commands to send to the physical circuitry layer. The control software module sends commands to controllable elements located in the physical circuitry layer to control the operation of the microgrid module.

Turning to the figures, in which like numerals indicate like elements throughout the figures, exemplary embodiments of the present invention are illustrated and will be described in the following text. Those of skill in the art will appreciate that the following are merely non-limiting preferred embodiments and alternate embodiments can be implemented in accordance with the invention.

Referring to FIG. 1, an exemplary architecture for a microgrid module 5 can be depicted in three layers. The first layer is the physical circuitry layer 10. The physical circuitry layer comprises the AC and DC input and output buses, the sensors and controllable elements that monitor and control the flow of power into and out of the microgrid module, and other conventional electrical components such as converters and transformers. The sensors and controllable elements that monitor and control the microgrid module can vary from simple sensors and switches to more complex "intelligent" sensors and switches that can include their own software and processing capabilities. Exemplary, non-limiting embodiments of the physical circuitry layer 10 are depicted in greater detail in FIG. 3, FIGS. 4A-4D and in the related application entitled "System and Method for a Controlled Integrated DC and AC Bus Microgrid" filed concurrently with this application.

The intermediate layer of the architecture for the microgrid is the control software layer 15 and the final layer is the rules management layer 20 which includes business, regulatory and safety rules. The control software layer 15 is typically installed on a local computing device and can be implemented in, for example, active message queuing/message broker software as is known to those of ordinary skill in the art. While the control software layer is typically installed on a local computing device that is part of the microgrid module, those of ordinary skill in the field will understand that software modules controlling the microgrid module or its components can be installed in components of the physical circuit layer or in other computing devices coupled to the microgrid module. The rules management layer 20 also is typically installed on a local computing device and can be implemented in, for example, a virtual machine with a service oriented architecture and use SOAP (Simple Object Access Protocol) as a messaging protocol. The rules management layer 20 comprises the power management software module referenced above and described in greater detail in the following text.

Figure 2:
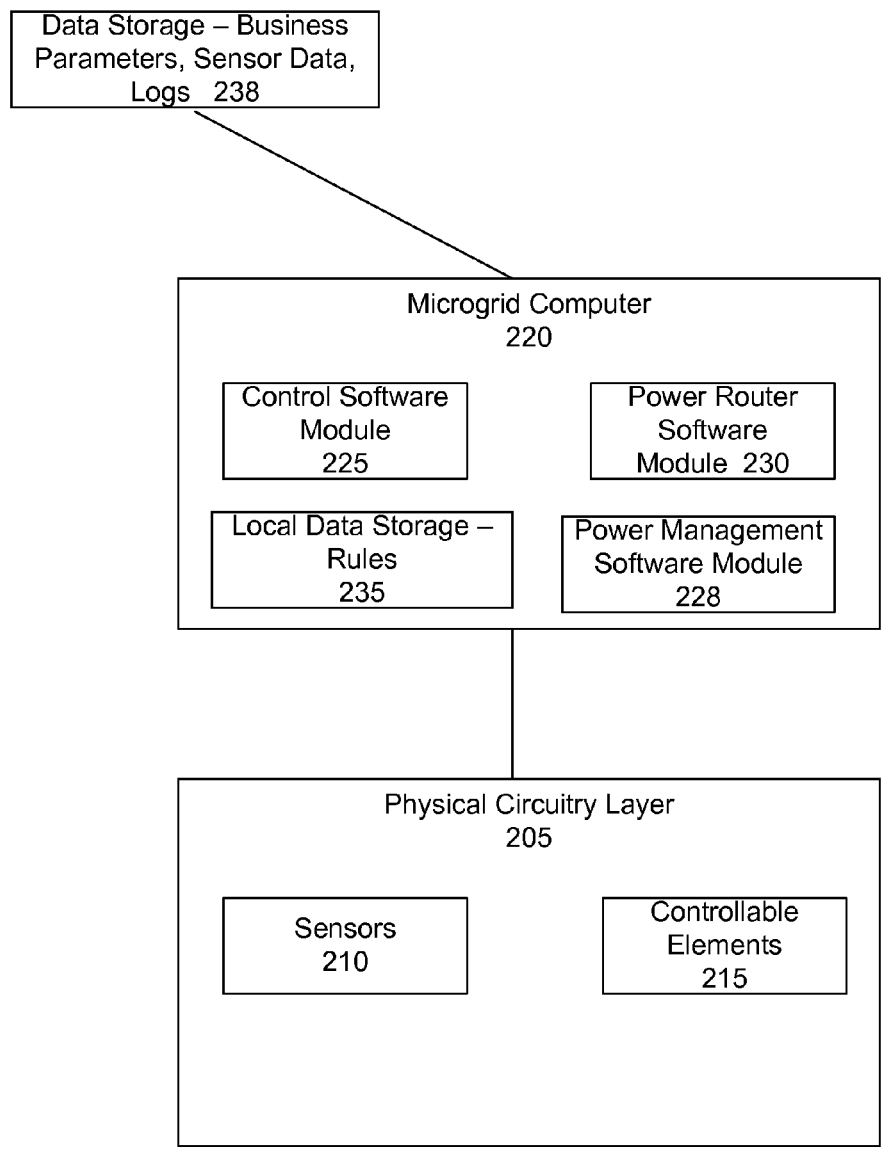
FIG. 2 is a diagram illustrating an overview of components in accordance with an exemplary embodiment of the invention.

Referring to FIG. 2, another exemplary architecture diagram illustrates in further detail the components of an exemplary microgrid module. FIG. 2 shows the physical circuit layer 205 comprising sensors 210 and controllable elements 215. The sensors 210 can collect data from the AC and DC buses (not shown in FIG. 2) and deliver the collected data to the microgrid computer 220. The sensors 210 can detect a variety of power conditions including direction, voltage, current and power levels, and associated changes and the rate of change of these parameters. For example, the sensors can provide data indicating a demand for power, data indicating the flow of power within the microgrid module, and data indicating an interruption in the flow of power to the microgrid module. The controllable elements 215 can include switches, power converters, and other intelligent electrical devices to control the flow of power to and from the microgrid module. Intelligent electrical devices typically include their own software and processing capabilities. The controllable elements 215 can receive commands from the control software module 225 of the microgrid computer 220. In certain embodiments, intelligent controllable elements can perform control functions without communicating with a separate microgrid computer.

The microgrid computer 220 provides a single or multiple user interface to the various controllable microgrid elements. The microgrid computer 220 communicates with the sensors 210 and controllable elements 215 of the physical circuit layer. The microgrid computer 220 comprises installed power management software module 228 and control software module 225. The power management software module 228 can retrieve business parameters from computer memory such as remote memory device 238. The power management software module converts the business parameters into rules that the control software module 225 can apply to the operation of a microgrid module. The control software module 225 uses the rules to process data received from the sensors 210 and generate commands for sending to the controllable elements 215. The microgrid computer 220 can also comprise power router software module 230 that controls the flow of power to and from the microgrid module and other microgrid modules. For example, in certain embodiments multiple microgrid modules can be coupled in various arrangements.

The microgrid computer 220 also can comprise local data storage 235 and can be coupled to remote data storage 238. The remote storage device 238 can store business parameters, sensor data, and log data. The business parameters can be defined by the operator of the microgrid and may represent a variety of "real world" parameters. As one example, the business parameters can represent the costs of power from the conventional AC power grid and from alternate power sources coupled to the microgrid. In another example, the business parameters can represent expected load demands and preferences for certain power sources. The sensor data that can be stored at the remote data storage device 238 is the data the control software module 225 receives from the sensors 210. The power management software module 228 can access this sensor data to adjust the rules based on the operation of the microgrid module. The remote storage device 238 can also store log data describing the operation of the microgrid module over time that can be used for further planning and operation of the microgrid module.

In the preferred embodiment, the local data storage 235 stores the rules created by the power management software module 228 from the business parameters. The control software module 225 uses the rules to control the controllable elements 215. Locally storing the rules assists the control software module 225 to respond quickly to changes in power supplied to the microgrid module. For example, the rules can define when the microgrid module will draw power from a power storage device or from the conventional utility grid. More generally, the rules can control various operating modes for the microgrid module including islanding, peak shaving, power conditioning, aggregate load reduction, and the sale of power back to a utility. In alternate embodiments of the invention, software modules and data storage devices can be located either locally or remotely in different arrangements of computing environments.

Although the exemplary embodiments herein are generally described in the context of software modules running on a computing device local to the physical circuitry layer as in FIG. 2, those skilled in the art will recognize that the present invention also can be implemented in conjunction with other program modules in other types of computing environments. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description of the exemplary embodiments includes processes and symbolic representations of operations by conventional computer components, including processing units, memory storage devices, display devices and input devices. These processes and symbolic representations are the means used by those skilled in the art of computer programming and computer construction to most effectively convey teachings and discoveries to others skilled in the art. These processes and operations may utilize conventional computer components in a distributed computing environment, including remote file servers, remote computer servers, and remote memory storage devices. Each of these conventional distributed computing components is accessible by a processing unit via a communications network.

The present invention includes computer hardware and software which embody the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the invention. The inventive functionality of the claimed computer hardware and software will be explained in more detail in the following description in conjunction with the other figures in the application.

Figure 2A:
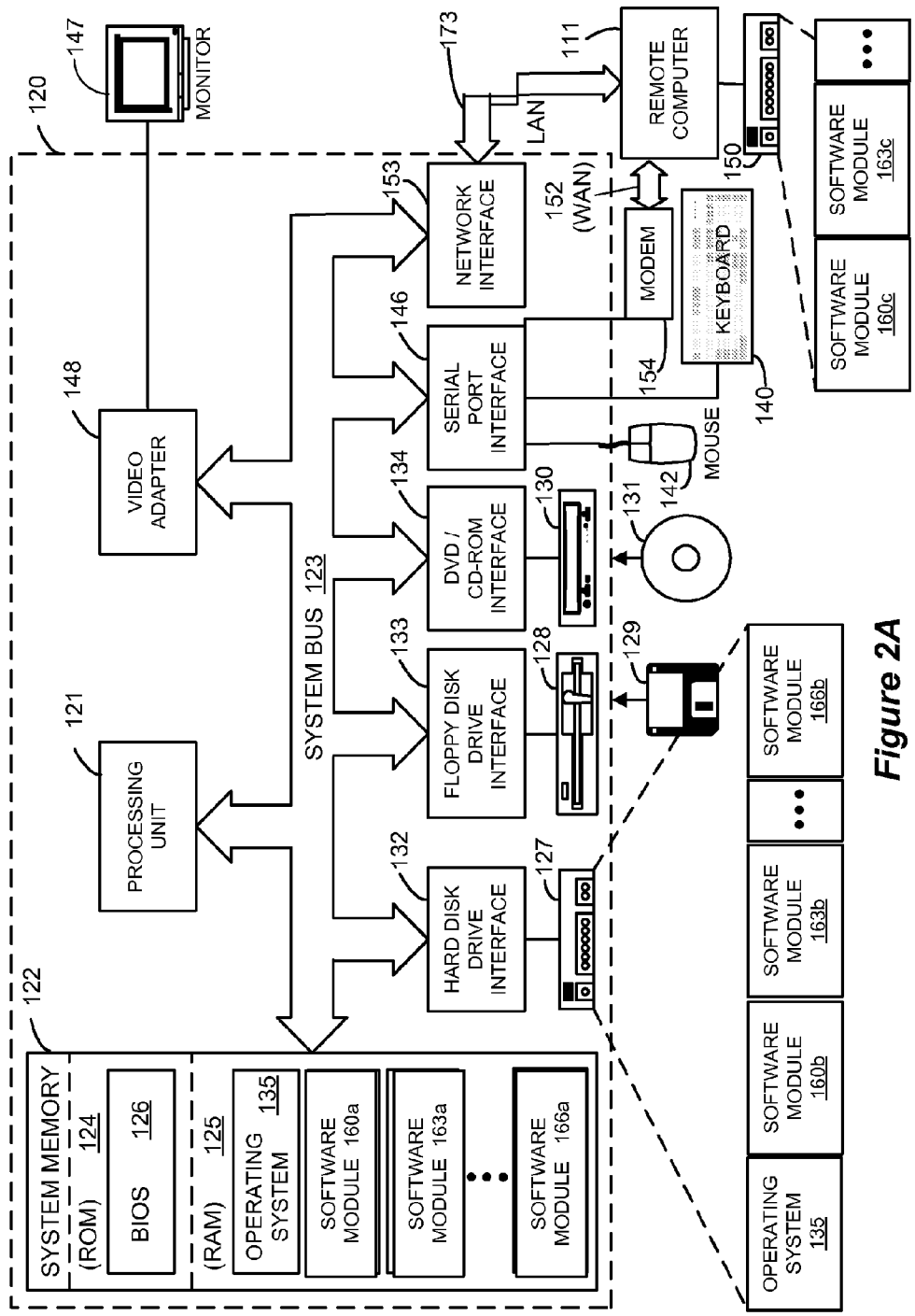
FIG. 2A is a diagram illustrating the components of a computing device in accordance with an exemplary embodiment of the invention.

Referring now to FIG. 2A, aspects of an exemplary computing environment in which the present invention can operate are illustrated. Those skilled in the art will appreciate that FIG. 2A and the associated discussion are intended to provide a brief, general description of the preferred computer hardware and program modules, and that additional information is readily available in the appropriate programming manuals, user's guides, and similar publications.

FIG. 2A illustrates a conventional computing device 120 suitable for supporting the operation of the preferred embodiment of the present invention such as the microgrid computer. As illustrated previously in FIG. 2, the microgrid computer 220 typically comprises multiple software modules. While not required for the computing device implemented in a microgrid module, the computing device 120 illustrated in FIG. 2A operates in a networked environment with logical connections to one or more remote computers 111. The logical connections between computing device 120 and remote computer 111 are represented by a local area network 173 and a wide area network 152. Those of ordinary skill in the art will recognize that in this client/server configuration, the remote computer 111 may function as a file server or computer server.

The computing device 120 includes a processing unit 121, such as "PENTIUM" microprocessors manufactured by Intel Corporation of Santa Clara, Calif. The computing device 120 also includes system memory 122, including read only memory (ROM) 124 and random access memory (RAM) 125, which is connected to the processor 121 by a system bus 123. The preferred computing device 120 utilizes a BIOS 126, which is stored in ROM 124. Those skilled in the art will recognize that the BIOS 126 is a set of basic routines that helps to transfer information between elements within the computing device 120. Those skilled in the art will also appreciate that the present invention may be implemented on computers having other architectures, such as computers that do not use a BIOS, and those that utilize other microprocessors.

Within the computing device 120, a local hard disk drive 127 is connected to the system bus 123 via a hard disk drive interface 132. A floppy disk drive 128, which is used to read or write a floppy disk 129, is connected to the system bus 123 via a floppy disk drive interface 133. A CD-ROM or DVD drive 130, which is used to read a CD-ROM or DVD disk 131, is connected to the system bus 123 via a CD-ROM or DVD interface 134. A user enters commands and information into the computing device 120 by using input devices, such as a keyboard 140 and/or pointing device, such as a mouse 142, which are connected to the system bus 123 via a serial port interface 146. Other types of pointing devices (not shown in FIG. 2A) include track pads, track balls, pens, head trackers, data gloves and other devices suitable for positioning a cursor on a computer monitor 147. The monitor 147 or other kind of display device is connected to the system bus 123 via a video adapter 148.

The remote computer 111 in this networked environment is connected to a remote memory storage device 150. This remote memory storage device 150 is typically a large capacity device such as a hard disk drive, CD-ROM or DVD drive, magneto-optical drive or the like. Those skilled in the art will understand that software modules are provided to the remote computer 111 via computer-readable media. The computing device 120 is connected to the remote computer by a network interface 153, which is used to communicate over the local area network 173.

In an alternative embodiment, the computing device 120 is also connected to the remote computer 111 by a modem 154, which is used to communicate over the wide area network 152, such as the Internet. The modem 154 is connected to the system bus 123 via the serial port interface 146. The modem 154 also can be connected to the public switched telephone network (PSTN) or community antenna television (CATV) network. Although illustrated in FIG. 2A as external to the computing device 120, those of ordinary skill in the art can recognize that the modem 154 may also be internal to the computing device 120, thus communicating directly via the system bus 123. Connection to the remote computer 111 via both the local area network 173 and the wide area network 152 is not required, but merely illustrates alternative methods of providing a communication path between the computing device 120 and the remote computer 111.

Although other internal components of the computing device 120 are not shown, those of ordinary skill in the art will appreciate that such components and the interconnection between them are well known. Accordingly, additional details concerning the internal construction of the computing device 120 need not be disclosed in connection with the present invention.

Those skilled in the art will understand that program modules, such as an operating system 135 and other software modules 160a, 163a and 166a, and data are provided to the computing device 120 via computer-readable media. In the preferred computing device, the computer-readable media include the local or remote memory storage devices, which may include the local hard disk drive 132, floppy disk 129, CD-ROM or DVD 131, RAM 125, ROM 124, and the remote memory storage device 150.

Figure 3:
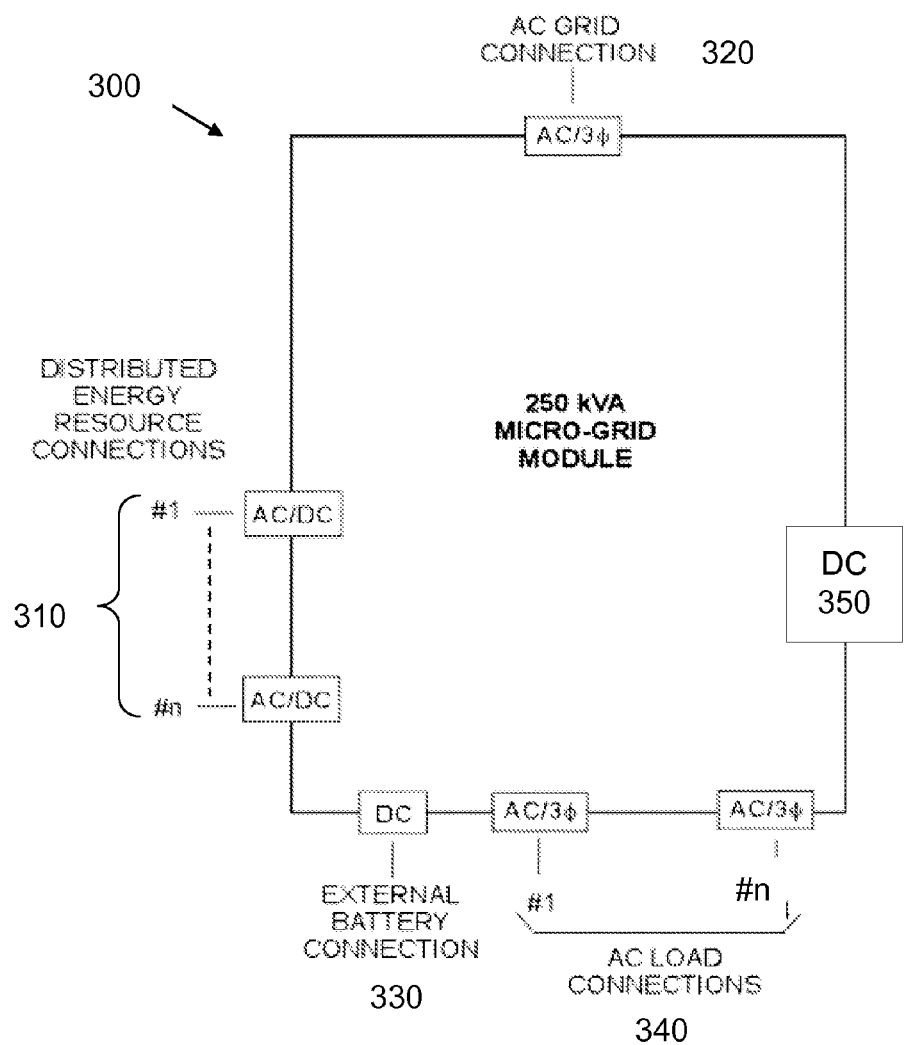
FIG. 3 is a diagram illustrating an overview of the components of the physical circuit layer in accordance with an exemplary embodiment of the present invention.

Referring to FIG. 3, an exemplary microgrid module 300 is shown. As illustrated, the microgrid module 300 may operate from a variety of power sources, including a connection to the local utility grid 320 and one or more distributed energy resources ("DERs") 310 such as internal combustion engine/generator sets, microturbine generators, fuel cells, wind turbines, and photovoltaic arrays. In addition, the microgrid network may have to level the power demands of various loads against the available power sources using energy storage assets 330 which may include batteries (as shown), flywheels, electrochemical capacitors and/or superconducting magnetic energy storage components (SMES).

Although the microgrid module 300 is labeled as a 250 kVA module, that value is merely an example and other microgrid modules within the scope of this invention can be designed to handle smaller or larger amounts of power. The microgrid module may have to provide power to several load systems with a variety of power format requirements including 208 V-3 phase, 480 V-3 phase, 120 V-single phase, 48 VDC, and 300 VDC as examples. As illustrated in FIG. 3, the microgrid module 300 includes one or more AC output buses that supplies power to one or more AC loads 340. Exemplary microgrid module 300 also includes a DC output bus 350 supplying power to a DC load. Processing power to flow from various sources to various load and energy storage assets and from energy storage assets to the loads requires the use of power conversion to interface various incoming and outgoing power formats.

The exemplary embodiments set forth in FIGS. 4A-4D illustrate in greater detail the components of the microgrid module 300 shown in FIG. 3. FIGS. 4A-4D are broken up into four more detailed components of the overview shown in FIG. 3. Those of skill in the art will recognize that the embodiments shown in FIGS. 4A-4D may be modified by adding, removing, or rearranging conventional electrical components without departing from the scope of the invention.

Figure 4A:
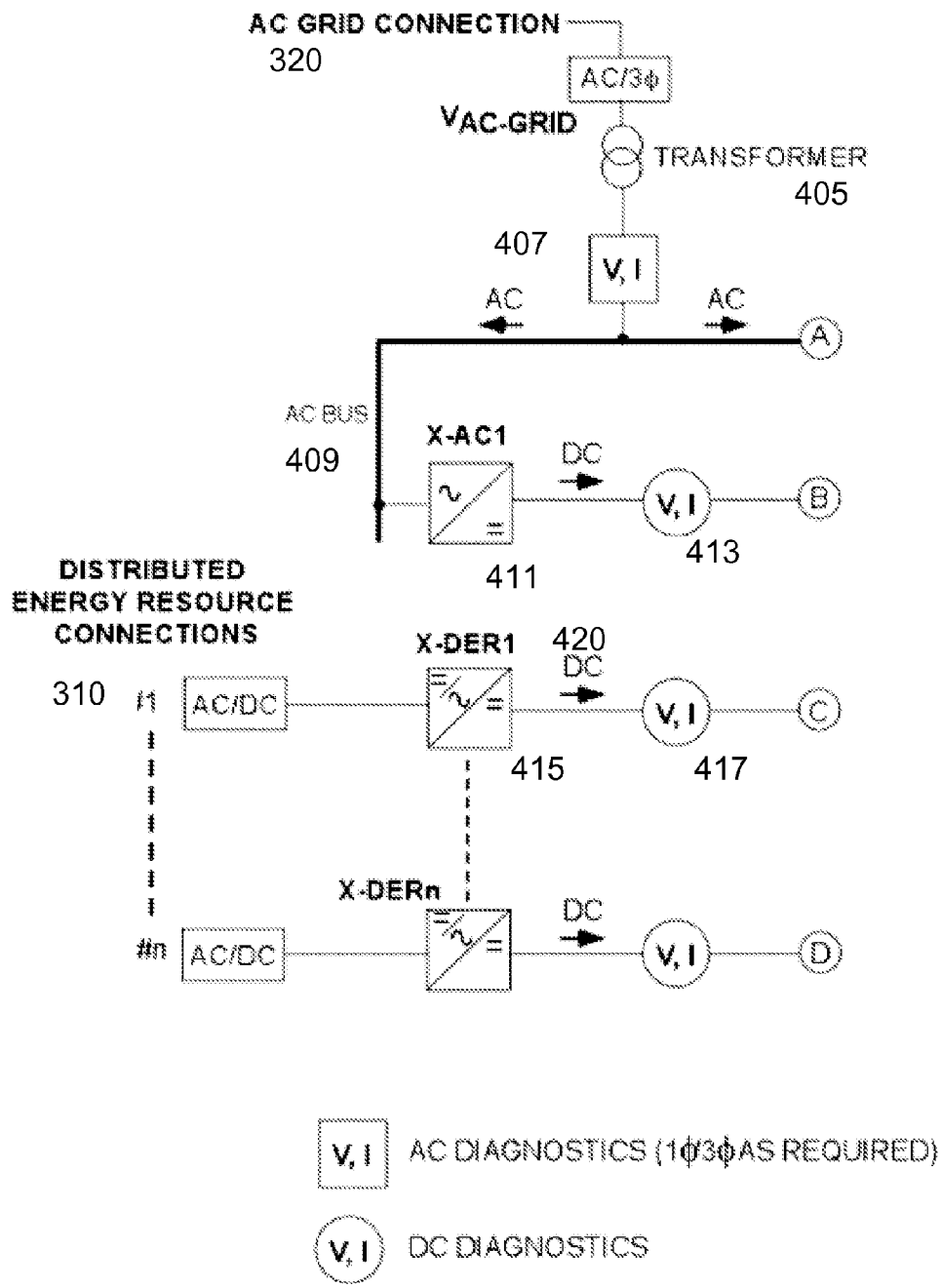
FIGS. 4A through 4D are diagrams illustrating portions of the components of the physical circuit layer in accordance with an exemplary embodiment of the present invention.

Turning to FIG. 4A, DERs 310 are illustrated as connected to DC input bus 420. As illustrated in FIG. 4A, the microgrid module may comprise one or more DC input buses 420 and may be coupled to one or more DERs 310. As explained previously, the DERs 310 can be one or more of a variety of energy sources, including conventional and renewable energy sources. If the DER 310 is an AC power source, a converter 415 can be used to convert the AC power to DC power for transmission onto the DC input bus 420. The DC input bus 420 can also be coupled to a DC diagnostic element 417. The DC diagnostic element 417 can comprise one or more sensors that can communicate with the control software module 225.

FIG. 4A also illustrates an exemplary AC grid connection 320 that connects to the AC grid input bus 409 of the microgrid module. The connection with the AC grid allows power from the conventional utility grid to be fed to the microgrid module. In certain embodiments a transformer 405 will be necessary to adjust the voltage of the power flowing from the utility grid to the microgrid module. An AC diagnostic module 407 can also be located at the AC grid connection 320. The AC diagnostic module can comprise one or more sensors in communication with the control software module 225. The AC diagnostic module 407 can provide data to the control software module 225 about the flow of power from the utility grid to the microgrid module and the control software module 225 can control the power flow at this connection with one or more controllable elements in the physical circuitry layer. The AC grid input bus also can be coupled to converter 411 for converting AC power to DC power that flows to the DC input bus 420. The DC input bus receiving power from the AC grid input bus 409 can also comprise another DC diagnostic element 413.

Figure 4B:
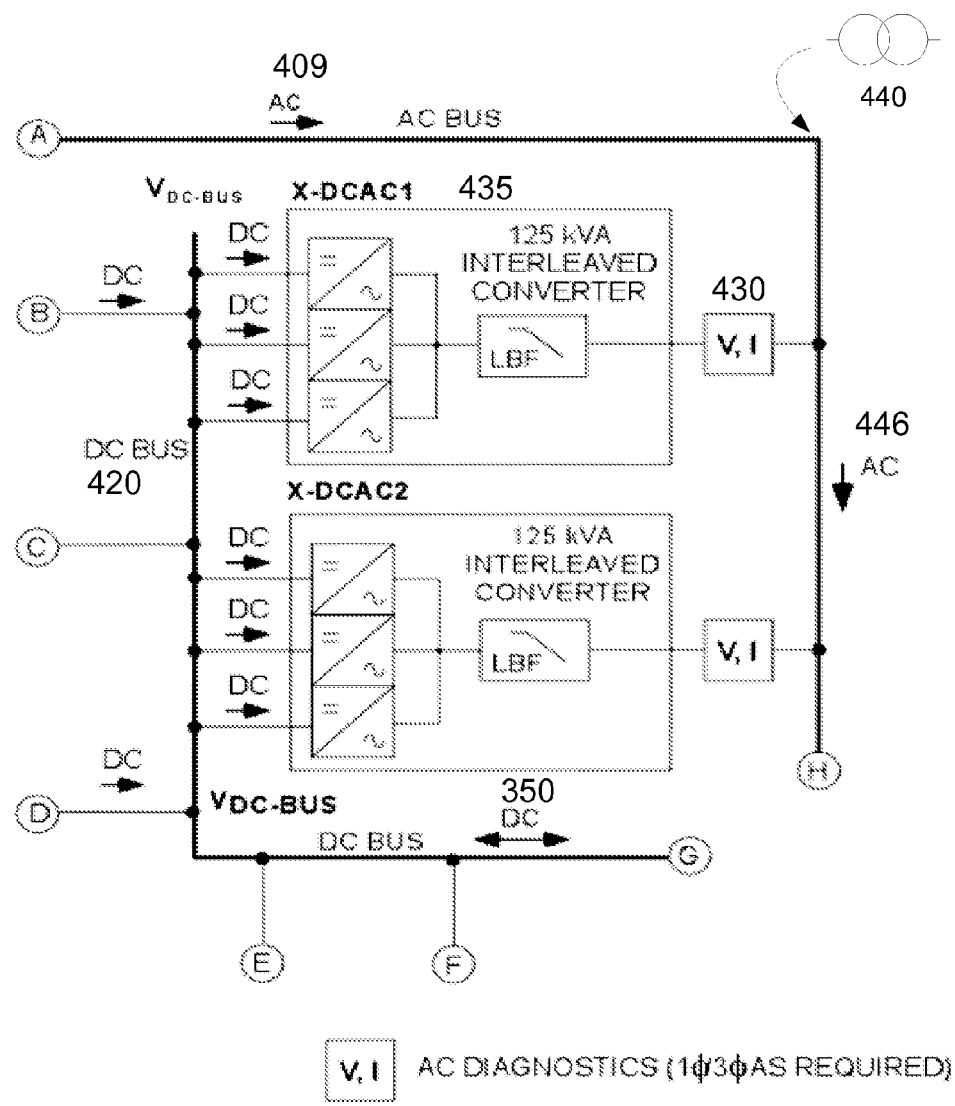
Figure 4C:
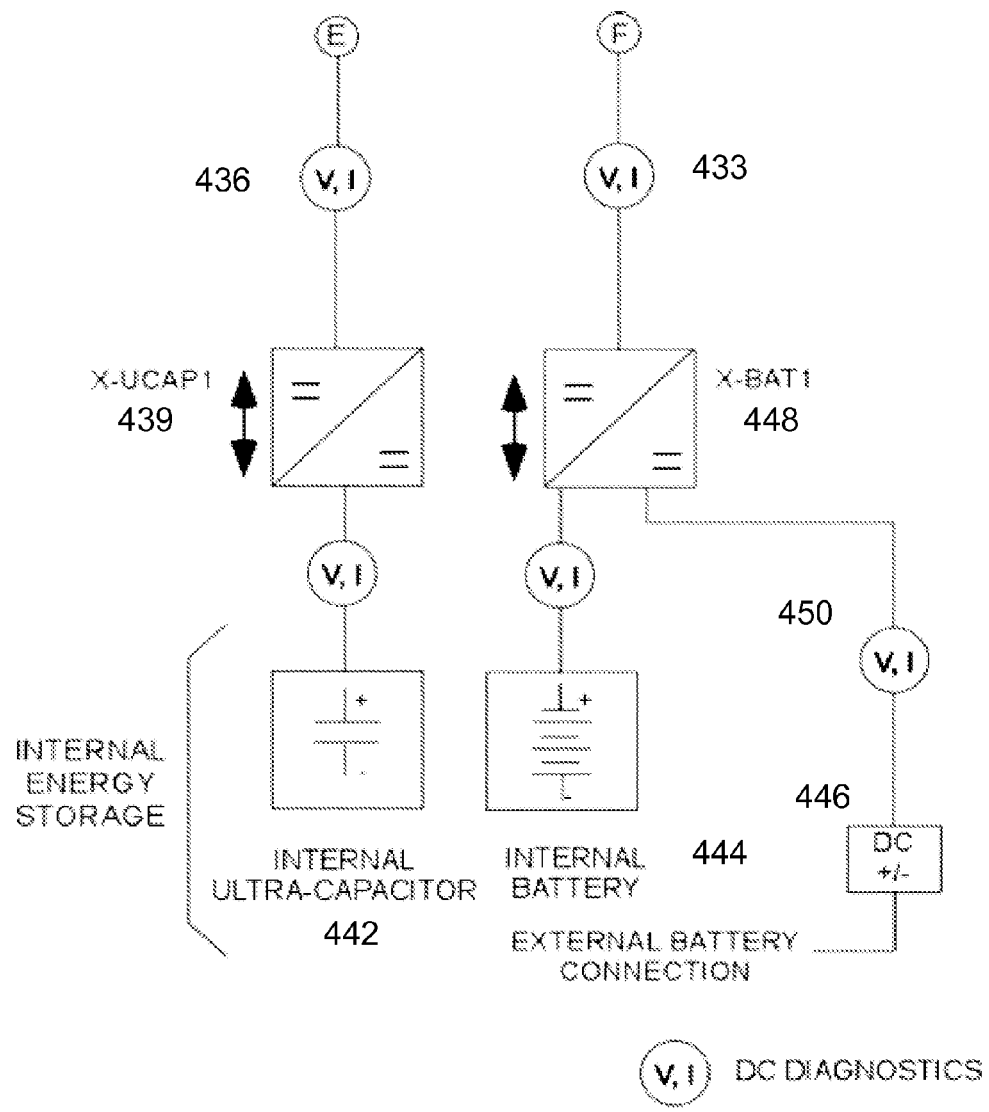
Figure 4D:
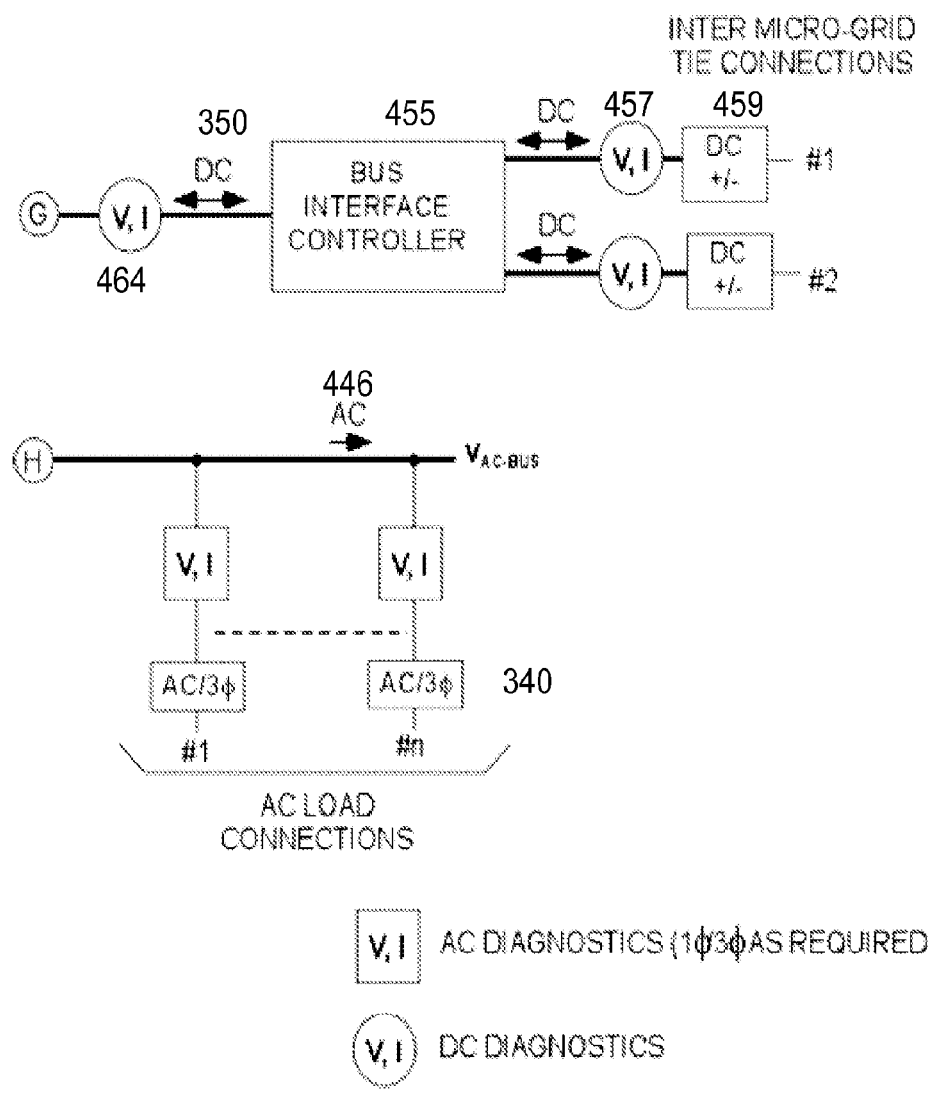

Referring to the exemplary illustration in FIG. 4B, one can see that connections A, B, C, and D from FIG. 4A have corresponding connection points A, B, C, and D in FIG. 4B. These connection points at A, B, C, and D do not represent physical elements of the microgrid module, but merely illustrate the connection points between FIGS. 4A and 4B. FIGS. 4C and 4D have a similar arrangement and FIGS. 4A-4D are intended to provide a more detailed illustration of the overview of the exemplary embodiment shown in FIG. 3.

In FIG. 4B, the DC input bus 420 has two primary connections. First, the DC input bus 420 can be coupled to a DC output bus 350 for supplying DC power from the microgrid module. The DC input bus 420 and DC output bus 350 may be linked through a power converter (not shown in FIG. 4B) if needed to adjust the input and output voltages. While the embodiment described in connection with FIGS. 4A through 4D includes a DC input bus and a DC output bus, those of skill in the art will recognize that two distinct DC buses are not required. For example, other microgrid modules may comprise a single DC bus that receives DC power at one point and delivers DC power at another point.

Second, the DC input bus can feed one or more converters 435 implemented to convert DC power to AC power for distribution on the AC output bus 446. The AC output bus 446 is coupled to the AC grid input bus 409 and a transformer 440 can be placed between the AC grid input bus 409 and the AC output bus 446 if needed to adjust the input and output voltages. As illustrated in exemplary FIG. 4B, an AC diagnostic element 430 can be placed between converter 435 and the AC output bus 446. The AC diagnostic element 430 can comprise one or more sensors allowing the control software module 225 to monitor and control the operation of the physical circuit layer of the microgrid module.

FIG. 4B includes connection points E and F to the elements of FIG. 4C. Exemplary FIG. 4C shows additional components of the exemplary microgrid module including internal ultra-capacitor 442 and internal battery 444. In alternate embodiments, the internal energy storage components shown in FIG. 4C may not be internal parts of the microgrid module but may be external and coupled to the microgrid module. For example, as shown in FIG. 4C, the DC output bus 350 (not shown in FIG. 4C) may be coupled to an external battery via connection 446. The energy storage devices shown in FIG. 4C are coupled to the DC output bus 350 via converters 439 and 448. These converters function to convert the DC voltage level associated with the energy storage elements with the voltage level of the DC output bus 350. Specifically, the voltage level associated with each energy storage device may be substantially different from that of the DC bus. Moreover, the voltage levels associated with each energy storage device may vary substantially depending on the state-of-charge of the energy storage device. In general, as an energy storage device is charged, its associated voltage increases. Similarly, in general, as an energy storage device is discharged while delivering energy to the microgrid module, the associated voltage decreases. Power converters 439 and 448 can adjust voltage levels so that the voltage level of the DC output bus 350 and the energy storage devices is consistent.

The energy storage devices also are coupled to one or more DC diagnostic elements 436, 433 and 450. As with other diagnostic elements previously discussed, the DC diagnostic elements 436, 433 and 450 can comprise one or more sensors in communication with the control software module 225. The energy storage devices illustrated in FIG. 4C are merely representative and those of skill in the art will appreciate that other arrangements of energy storage devices can be placed either internal or external to the microgrid module and perform a similar function of storing energy provided by the microgrid module and subsequently providing it back to the microgrid module as needed.

Referring to FIG. 4D, exemplary elements connected to points G and H from FIG. 4B are illustrated. Point G shows the connection of the DC output bus 350 to a bus interface controller 455. The bus interface controller 455 controls the flow of power between the microgrid module illustrated in FIGS. 4A-4D and one or more other microgrid modules. As described in further detail in the related patent applications filed concurrently with this application, multiple microgrid modules can be coupled and the bus interface controller 455 manages the flow of power between the coupled microgrid modules. The bus interface controller 455 typically comprises control and power converter circuits that communicate with a controlling software module such as the power router control software module 230 illustrated in FIG. 2. One or more microgrid tie connections 459 connect the DC output bus 350 to other microgrid modules. The DC output bus can also comprise one or more DC diagnostic elements 464 and 457 which can perform sensing functions as described previously.

FIG. 4D also illustrates exemplary elements connected to the AC output bus 446 at point H. One or more AC load connections 340 can be coupled to the AC output bus 446. The 3-phase AC load connection shown in FIG. 4D is merely exemplary and a variety of AC loads having different voltages and phase combinations can be connected to the AC output bus 446 of the microgrid module. The AC load connections can also comprise AC diagnostic elements similar to those described previously.

Figure 5:
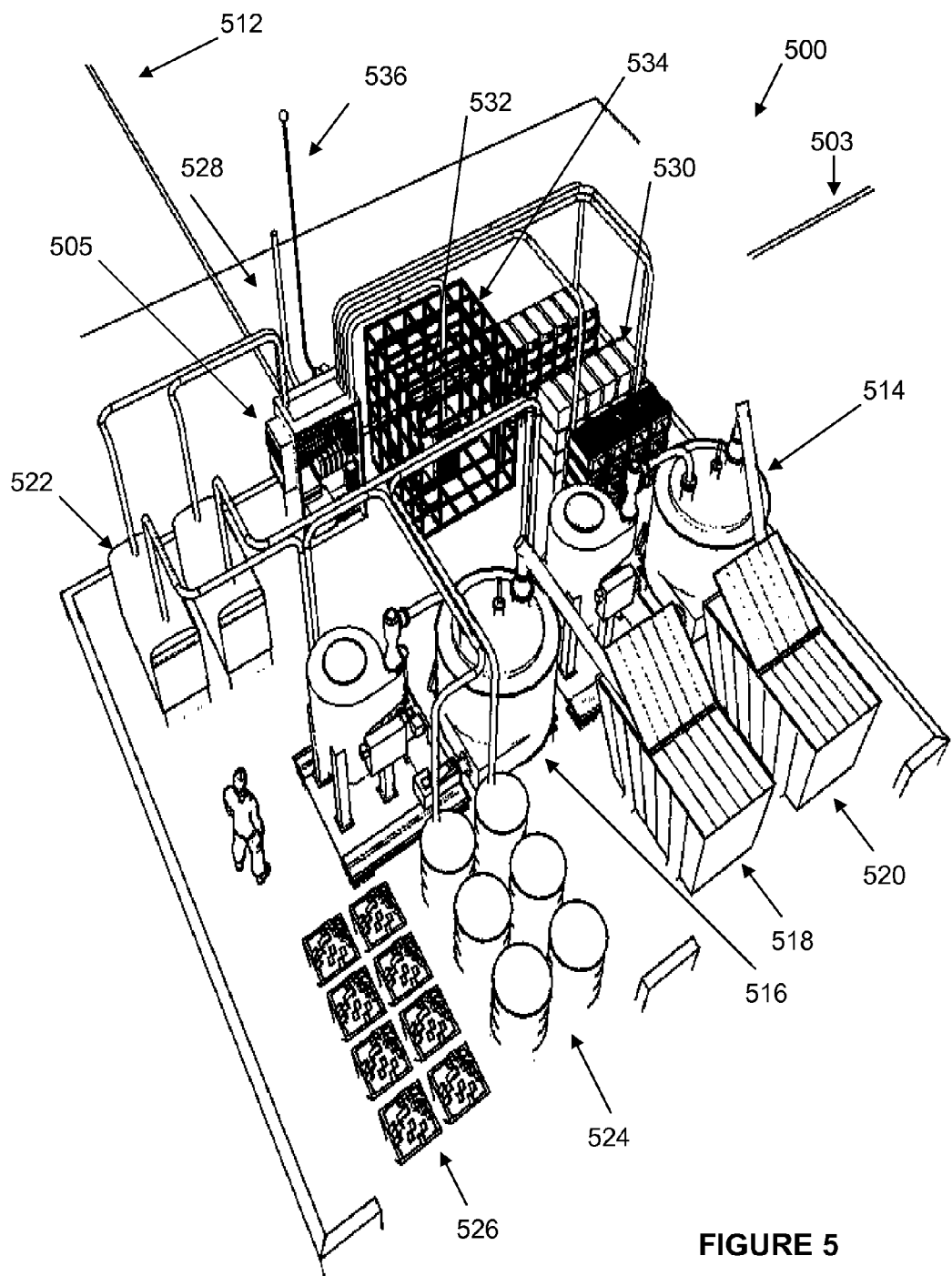
FIG. 5 is a diagram illustrating components of a microgrid in accordance with an exemplary embodiment of the invention.

Referring to FIG. 5, an exemplary microgrid 500 is illustrated. In this instance, microgrid 500 is providing power to a site such as a hospital (not shown in FIG. 5) via output bus 503. The output bus 503 may transmit either AC or DC power from the microgrid module 505 to the site. The microgrid module 505 is coupled to the conventional utility power grid via AC grid input bus 512 and to various distributed energy resources. The distributed energy resources illustrated in the exemplary microgrid 500 in FIG. 5 include two pyrolysis generator sets 514 and 516 that burn waste from waste input containers 518 and 520. The distributed energy resources also include methane generator set 522 and solar power via a solar power input 528. Outputs from the microgrid 500 include useable biofuel 524 and ash waste output 526.

The exemplary microgrid 500 includes energy storage devices 530, such as batteries and ultra-capacitors. As explained previously, in other embodiments of the invention different energy storage devices can be implemented in different arrangements. For example, the energy storage devices can be located within the microgrid module 505 or can be located offsite from the microgrid module 505. The exemplary microgrid 500 shown in FIG. 5 also includes transformer 532 located in cage 534. In certain embodiments of the invention where the microgrid module is handling large loads, a separate transformer outside of the microgrid module 505, such as transformer 532 shown in FIG. 5, can be beneficial. The cage 534 surrounding the transformer 532 helps to insulate surrounding components from the powerful electric fields generated by the transformer 532. In embodiments using a transformer 532, the output bus 503 is typically connected to the transformer 532 instead of being connected directly to the microgrid module 505.

Although the details of the components of the microgrid module 505 are not labeled in FIG. 5, microgrid module 505 comprises a physical circuitry layer that includes AC and DC buses, power converters, sensors, and controllable elements. The microgrid module 505 also comprises a microgrid computer on which is installed a power management software module, a control software module, and local memory containing rules for operating the microgrid module 505. The microgrid computer can communicate with other computing devices via network cables (not shown) or via a wireless communications antenna 536. For example, the microgrid computer may communicate with remote computing devices or databases containing business parameters used by the power management software module. The microgrid computer may also transmit sensor data or other log data concerning the operation of the microgrid module 505 to a remote computing device.

Those of skill in the art will recognize that the microgrid 500 illustrated in FIG. 5 is merely exemplary and that other microgrids can be designed in different arrangements within the scope of this invention. For example, in alternate embodiments of the invention, the microgrid may comprise different distributed energy resources or the microgrid may not be connected to the conventional utility power grid. Likewise, alternate embodiments of the invention may not include energy storage devices or the energy storage devices may be only internal to the microgrid module 505. In other embodiments, the microgrid computer can be implemented in a variety of computing environments and can include other software such as a power router software module described further in the related patent applications filed concurrently with this application.

Figure 6:
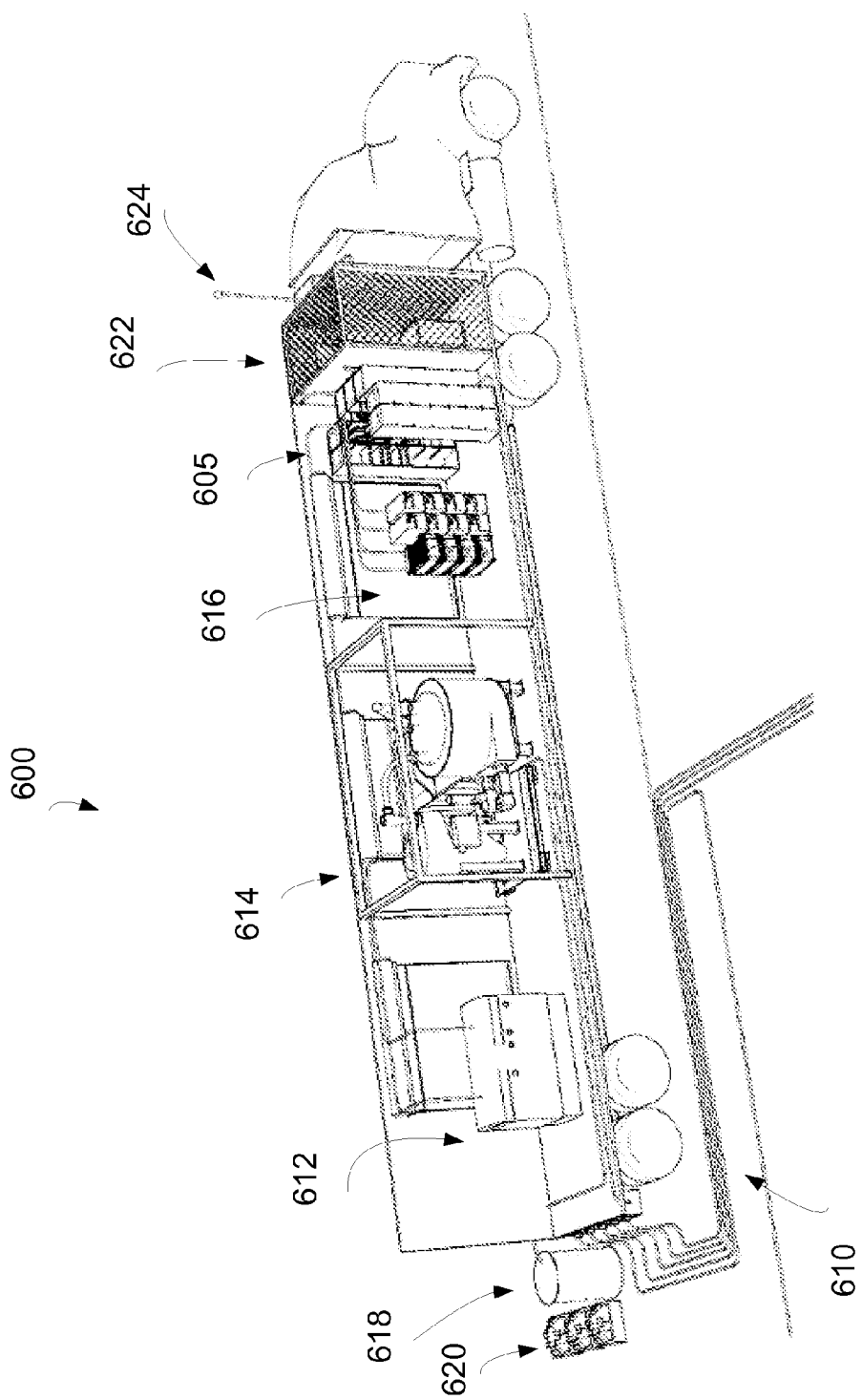
FIG. 6 is a diagram illustrating components of a mobile microgrid in accordance with another exemplary embodiment of the invention.

Referring to FIG. 6, an exemplary mobile microgrid 600 is illustrated. Many of the components illustrated in the mobile microgrid 600 are similar to those illustrated in microgrid 500 of FIG. 5, however, mobile microgrid 600 can be easily transported in a trailer to a variety of locations. The mobile microgrid 600 comprises a microgrid module 605 coupled to output buses 610 that transmit AC or DC power to one or more loads. The microgrid module 605 is coupled to two distributed energy resources—a methane generator 612 and a pyrolysis set 614—via a DC input bus (not shown). The distributed energy resources can also produce useable bio-fuel 618 and ash waste 620.

The microgrid module 605 also is coupled to energy storage devices 616, such as batteries or ultra-capacitors or a combination of both. The energy storage devices 616 can be charged by power supplied to the microgrid module 605 by the distributed energy resources 612 and 614. The energy storage devices 616 also can supply power for distribution by the microgrid module 605 via the output bus 610 to a load. For large loads, the microgrid module 605 can distribute power through a transformer such as transformer 622 which is shown located in a protective cage.

The microgrid module 605 in the mobile microgrid 600 can operate in much the same way as the microgrid modules described previously in FIGS. 2, 3, 4 and 5. For example, microgrid module 605 can comprise a physical circuitry layer including AC and DC buses, controllable elements, sensors, and power converters. Microgrid module 605 can also comprise a microgrid computer installed with a power management software module, a control software module, a local memory containing rules for operating the microgrid module. The microgrid computer can also communicate with remote computing devices via communications antenna 624. For example, the microgrid computer can receive parameters governing the operation of the mobile microgrid 600 via the antenna 624. The microgrid computer can also transmit data concerning the operation of the mobile microgrid 600 to a remote computer.

Those of skill in the art will appreciate that the mobile microgrid 600 illustrated in FIG. 6 is merely exemplary and that alternate embodiments can comprise different arrangements of components. In alternate embodiments of the mobile microgrid, different distributed energy resources can be employed. Similarly, alternate embodiments of the mobile microgrid may not require an external transformer such as transformer 622 or may not include energy storage devices such as devices 616.

Figure 7:
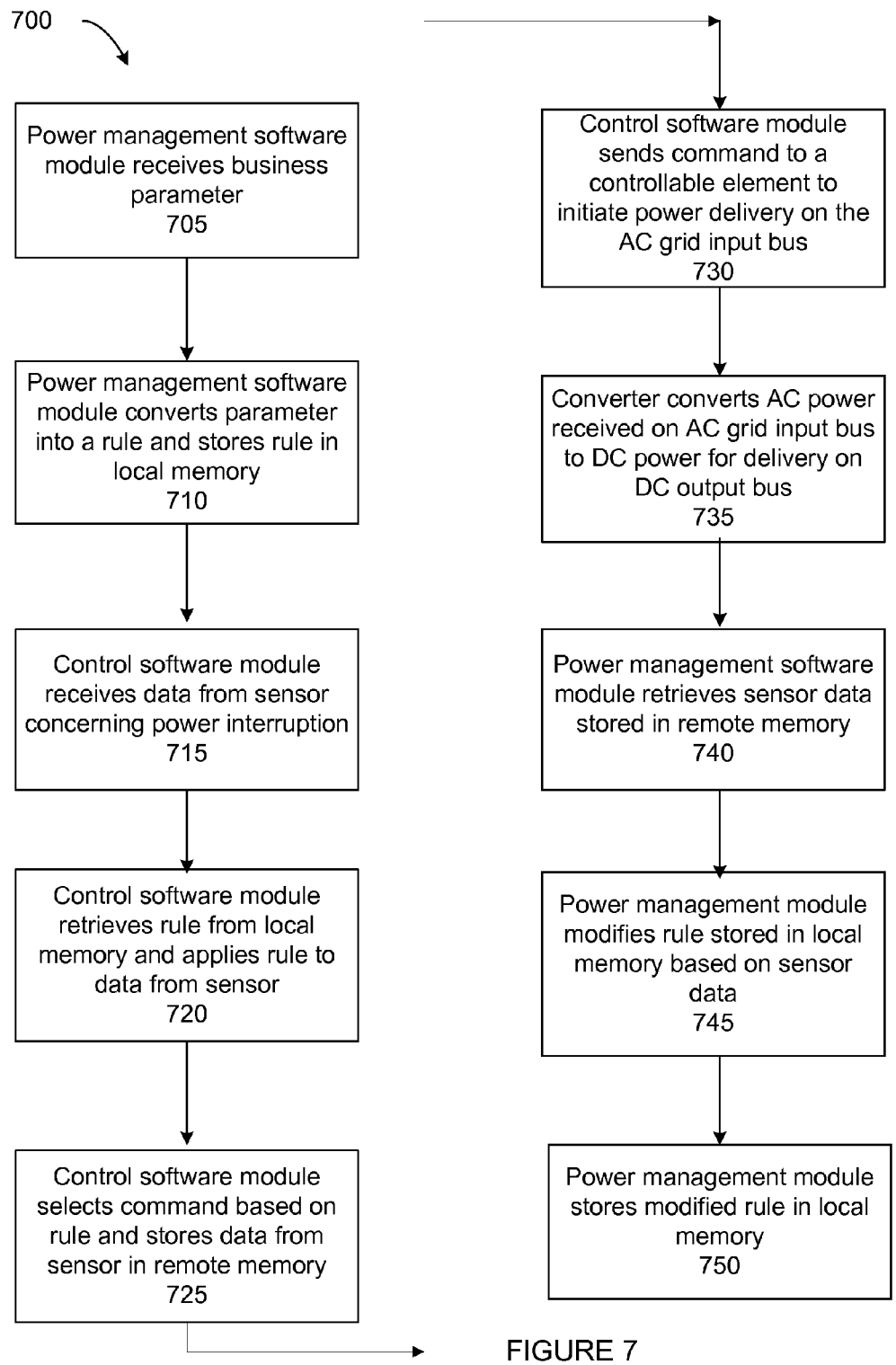
FIG. 7 is a flow chart diagram illustrating a process in accordance with an exemplary embodiment of the present invention.

Referring to FIG. 7, a method 700 is illustrated describing the operation of a microgrid module with a power management software module in accordance with one exemplary embodiment of the invention. Exemplary process 700 begins with the power management software module 228 receiving a business parameter from a remote computer-readable storage device 238 in step 705. For example, the business parameter may indicate a preference for power from a renewable energy source such wind or solar. While the business parameter is stored in remote computer-readable storage device 238 in the preferred embodiment, in other embodiments the business parameter can be stored in other locations including in local data storage device 235. In step 710, the power management software module 228 converts the business parameter into one or more rules to control the operation of the microgrid module. For example, the business parameter indicating a preference for power from a renewable energy source can be translated into rules identifying certain renewable distributed energy resources coupled to the microgrid module as the preferred sources of power over other sources of power coupled to the microgrid module.

Turning to step 715, the control software module 225 can receive data from a sensor 210 concerning a power interruption in the power supplied to the microgrid module. While step 715 and the other steps illustrated in exemplary process 700 are shown in sequence, those skilled in the art will appreciate that certain steps can occur in parallel or in a different sequence from that illustrated in process 700. For example, the receipt of data from sensors at the control software module in step 715 is a step that can occur at various times throughout process 700. In step 720, the control software module 225 can retrieve one or more rules from the local data storage device 235 and apply those rules to the data received from sensor 210. In step 725, the control software module 225 selects a command based on the rules. Using the previous example of a rule indicating a preference for renewable power sources, the command the control software module sends to a controllable element 215 may be to begin drawing power from a different renewable power source. In step 725, the control software module 225 also stores the data received from the sensor 210 in a data storage device such as device 238. The sensor data is stored so that it can be available for later use by the power management software module 230 to adjust rules based on the operation of the microgrid module.

Turning to step 730, control software module 225 sends a command to a controllable element 215 to initiate power delivery on the AC grid input bus 409. A power converter 411 can convert the AC power received on the AC grid input bus 409 to DC power for delivery on the DC output bus 350 in step 735. Alternatively, the converted DC power can be used to charge storage devices 442 and 444. In step 740, the power management software module 228 retrieves sensor data stored in remote memory device 238 in order to evaluate the operation of the microgrid module. If appropriate, in step 745 the power management software module 228 can modify the rule stored in local memory 235 after evaluating the sensor data. For example, a collection of sensor data may indicate that a particular renewable power source will not be available for an extended time. In such a situation, the power management software module 228 can modify the rules stored in local memory 235 so that the microgrid module does not attempt to draw power from the renewable power source while it is unavailable. Finally, in step 750, the power management software module 228 can store the modified rule in local memory 235 for use by the control software module 225.

The steps in exemplary process 700 are merely one example of the applications for the power management software module and the microgrid module. Those of skill in the art will appreciate that not all of the steps illustrated in process 700 are required in order to use the microgrid module. Furthermore, the steps of process 700 can be performed in other sequences and other steps can be added for other applications of the microgrid module.

In conclusion, the invention, as described in the foregoing exemplary embodiments, comprises a microgrid module that can receive either AC or DC power from a variety of power sources and supply either AC or DC power to a load or storage device. The microgrid module comprises a power management software module that can access business parameters and convert those business parameters into rules that control the operation of the microgrid module. A control software module has access to the rules stored locally on a microgrid computer. The rules determine what actions the control software module takes in response to changes in the power available to the microgrid.

The embodiments set forth herein are intended to be exemplary. From the description of the exemplary embodiments, equivalents of the elements shown herein and ways of constructing other embodiments of the invention will be apparent to practitioners of the art. For example, conventional electrical components can be added or modified within the microgrid but remain within the scope of the invention. Similarly, the methods described herein are merely exemplary and the control software module can be designed in a variety of ways to control the operation of the microgrid module. Many other modifications, features and embodiments of the invention will become evident to those of skill in the art. It should be appreciated, therefore, that many aspects of the invention were described above by way of example only and are not intended as required or essential elements of the invention unless explicitly stated otherwise. Accordingly, it should be understood that the foregoing relates only to certain embodiments of the invention and that numerous changes can be made therein without departing from the spirit and scope of the invention.

I claim:

1. A method for managing a microgrid module comprising:
a microgrid computer storing a business parameter;
a power management software module converting the business parameter into a rule;
the power management software module storing the rule in a computer-readable memory within the microgrid computer, the rule for use by a control software module;
the control software module receiving input from a sensor indicating an interruption in a power flow from a first power source supplying power to the microgrid module;
the control software module comparing the input to the rule stored in the computer-readable memory and selecting a command;
the control software module sending the command to a controllable element, the command directing the controllable element to permit power delivery to the microgrid module from a second power source coupled to the microgrid module.

2. The method of claim 1, wherein the first power source is an AC power grid supplying power to an AC input bus of the microgrid module.

3. The method of claim 1, wherein the second power source supplies power to a DC bus from one or more of a solar power source, a wind power source, and a biofuel power source.

4. The method of claim 3, wherein the power supplied to the DC bus from the second power source is supplied to a load coupled to the DC bus.

5. The method of claim 3, wherein the power supplied to the DC bus from the second power source is converted to AC power and supplied to a load via an AC output bus.

6. The method of claim 1, further comprising the step of the control software module storing the received input in the computer-readable memory.

7. The method of claim 6, further comprising the steps of the power management software module:
retrieving the stored input;
modifying the rule based on the input; and
storing the modified rule in the computer-readable memory.

8. A computer-readable medium comprising computer-executable program instructions for managing a microgrid module, the computer-executable instructions for execution by a computer comprising a processor, the computer-executable instructions comprising:
first program instructions for the computer to store a business parameter in a computer-readable memory;
second program instructions for a power management software module to convert the business parameter to a rule and store the rule in the computer-readable memory;
third program instructions for a control software module to receive data from a sensor indicating an interruption in a power flow from a first power source to the microgrid module;
fourth program instructions for the control software module to compare the received data to the rule stored in the computer-readable memory and to select a command;
fifth program instructions for the control software module to transmit the command to a controllable element, the command directing the controllable element to permit power delivery to the microgrid module from a second power source coupled to the microgrid module.

9. The computer-readable medium of claim 8, further comprising
sixth program instructions for the control software module to store the received data in the computer-readable memory.

10. The computer-readable medium of claim 8, further comprising
seventh program instructions for the power management software module to:
retrieve the stored data;
modify the stored rule based on the stored data; and
store the modified rule in the computer-readable memory.

11. The computer-readable medium of claim 8, wherein the data from the sensor indicates an interruption in the power flow from an AC power grid supplying power to an AC input bus of the microgrid module.

12. The computer-readable medium of claim 8, wherein the second power source identified by the command in the fifth program instructions supplies power to a DC bus of the microgrid module, wherein the DC power is from one or more of a solar power source, a wind power source, and a biofuel power source.

* * * * *